United States Patent
Van De Weijer et al.

(10) Patent No.: US 8,813,466 B2
(45) Date of Patent: Aug. 26, 2014

(54) CUTTING UNIT AND ROTOR TINES WITH SCRAPER

(75) Inventors: Antonius Josephus Jasper Van De Weijer, KB Helmond (NL); Henriekus Theodorus Hubertus Tenbult, KL Bladel (NL)

(73) Assignee: Kuhn-Geldrop B.V., Geldrop (NL)

( * ) Notice: Subject to any disclaimer, the term of this patent is extended or adjusted under 35 U.S.C. 154(b) by 0 days.

(21) Appl. No.: 13/699,185

(22) PCT Filed: May 19, 2011

(86) PCT No.: PCT/EP2011/002515
§ 371 (c)(1),
(2), (4) Date: Mar. 18, 2013

(87) PCT Pub. No.: WO2011/144349
PCT Pub. Date: Nov. 24, 2011

(65) Prior Publication Data
US 2013/0167497 A1 Jul. 4, 2013

(30) Foreign Application Priority Data

May 20, 2010 (EP) .................................... 10005288

(51) Int. Cl.
*A01D 39/00* (2006.01)
*A01D 43/02* (2006.01)
*A01D 75/00* (2006.01)

(52) U.S. Cl.
USPC ........................................................ 56/341

(58) Field of Classification Search
USPC .................. 56/341; 100/88; 460/112; 53/527
See application file for complete search history.

(56) References Cited

U.S. PATENT DOCUMENTS 5,519,990 A * 5/1996 Rodewald et al. ............... 56/341
5,680,999 A * 10/1997 Wada ............................ 241/236

(Continued)

FOREIGN PATENT DOCUMENTS

DE 198 41 598 3/2000
DE 10017984 A1 * 10/2001

(Continued)

OTHER PUBLICATIONS

European Office Action issued Jun. 13, 2013 in Patent Application No. 10 005 288.5.

(Continued)

*Primary Examiner* — Árpád Fábián-Kovács
(74) *Attorney, Agent, or Firm* — Oblon, Spivak, McClelland, Maier & Neustadt, L.L.P.

(57) ABSTRACT

A cutting unit for agricultural machines, including a rotor carrying on a base body spaced apart tine arrangements with circumferential phase shifts between adjacent tine arrangements. Each tine arrangement includes at least one tine with a base secured to the rotor base body and an outwardly protruding triangular tine tip forming a conveying flank leading in the rotor rotation direction and extending from the tine end to a transition into the base. A cutting unit bottom forms a lower boundary of a conveying channel. Cutting blades protrude from the cutting unit bottom through the conveying channel besides moving paths of the tine tips. Scrapers are placed in a conveying direction through the conveying channel behind the rotor. A compression surface provided at the base of the tine ahead of the conveying flank in the rotor rotation direction gradually ascends at least substantially up to the transition into the conveying flank.

13 Claims, 6 Drawing Sheets

(56) References Cited

U.S. PATENT DOCUMENTS

| | | | | |
|---|---|---|---|---|
| 5,974,776 | A | * | 11/1999 | Prellwitz .......................... 56/504 |
| 5,979,153 | A | * | 11/1999 | Roth ............................... 56/341 |
| 6,298,646 | B1 | * | 10/2001 | Schrag et al. ................... 56/341 |
| 6,595,123 | B2 | * | 7/2003 | Schrag et al. ................... 100/97 |
| 6,651,418 | B1 | * | 11/2003 | McClure et al. ................. 56/341 |
| 6,679,040 | B2 | * | 1/2004 | Lucand et al. .................. 56/341 |
| 6,679,041 | B2 | * | 1/2004 | Viaud et al. ..................... 56/341 |
| 6,679,042 | B1 | * | 1/2004 | Schrag et al. ................... 56/341 |
| 6,769,239 | B1 | * | 8/2004 | Webb ............................... 56/341 |
| 6,874,311 | B2 | * | 4/2005 | Lucand et al. .................. 56/341 |
| 6,886,312 | B1 | * | 5/2005 | Inman et al. .................... 53/527 |
| 6,910,325 | B2 | * | 6/2005 | Viaud ............................. 56/341 |
| 7,252,587 | B2 | * | 8/2007 | Viaud .......................... 460/109 |
| 7,584,594 | B2 | * | 9/2009 | Viaud ............................. 56/364 |
| 7,694,504 | B1 | * | 4/2010 | Viaud et al. ..................... 56/341 |
| 7,716,910 | B2 | * | 5/2010 | Woodford ....................... 56/364 |
| 7,867,072 | B2 | * | 1/2011 | Lauwers et al. .............. 460/112 |
| 8,205,424 | B1 | * | 6/2012 | Lang et al. ...................... 56/341 |
| 8,240,117 | B1 | * | 8/2012 | McClure et al. ................ 56/341 |

FOREIGN PATENT DOCUMENTS

| | | |
|---|---|---|
| DE | 195 41 561 | 12/2004 |
| DE | 10 2004 061 678 | 7/2006 |
| KR | 10-0927671 | 11/2009 |
| NL | 1023390 | 11/2004 |

OTHER PUBLICATIONS

European Search Report Issued Oct. 18, 2010 in Application No. EP 10 00 5288 Filed May 20, 2010.

International Search Report Issued Aug. 11, 2011 in PCT/EP11/02515 Filed May 19, 2011.

Office Action issued Oct. 4, 2012 in European Patent Application No. 10 005 288.5.

Korean Office Action issued in KR 10-2012-7033094 on Mar. 12, 2014 (w/ English translation).

* cited by examiner

CUTTING UNIT AND ROTOR TINES WITH SCRAPER

BACKGROUND OF THE INVENTION

1. Field of the Invention

The invention relates to a cutting unit for agricultural machines according to the preamble part of claim 1.

The cutting unit of a baler, in particular, a round baler, has to cut crop material, e.g. supplied by a pick-up device and to convey the cut crop material into a bale forming cavity. The cutting unit of a loading wagon has to cut the crop material, e.g. supplied by a pick-up device and to convey the cut crop into a storage hopper of the loading wagon. The tine arrangements take the supplied crop and force the crop over the cutting blades, which cut the crop material into smaller pieces. During and/or after the cutting process, the scrapers remove the cut crop material from the tine arrangements and guide it further in conveying direction through the conveying channel. In the case of e.g. round balers, the conveying channel has an inlet and an outlet, which are substantially in-line with each other, such that each of the tines engages into the crop material over a rotation of the rotor of about 180°. In the case of the loading wagon, the outlet of the conveying channel may extend upwardly, such that the tines engage into the crop material over an angular range of about 270°.

2. Description of the Related Art

The example of a cutting unit of a round baler known from EP 0815720 A has a plurality of axially spaced apart, parallel tine arrangements on the base body of the rotor. A circumferential phase shift is provided between adjacent tine arrangements. Each tine arrangement consists of two ring structures each having two diametrically opposed triangular tine tips. The cutting blades either engage between the ring structures and/or between and/or at the side or sides of the ring structures. The tines provided are so-called low-base tines, meaning that each tine has a triangular tine tip and a low-base extending, e.g. to both circumferential sides of the tine tip. The base firmly secures the tine to the periphery of the base body of the rotor. The constant distance of the outer contour of the low-base from the axis of the rotor e.g. amounts to about half of the radial distance of the tine end from the axis. An advantage of a low-base tine is that the rotor with the low-base tines facilitates to process a high flow rate of crop material in the cutting unit. However, in particular, in a cutting unit, where the crop material supplying direction is almost in line with the outlet direction from the conveying channel, as e.g. in most round balers, the crop material conveyed by each tine may markedly be pressed against the scraper before cutting a cutting blade, or in case of a cutting blade having a steep cutting edge the crop material will be pressed by the tine tip almost perpendicularly against the cutting edge. Moreover, the crop material mainly is cut with a squeezing cutting action on the cutting edge of the cutting blades, because the outer contour of the base remains passive, while the crop material is forced by the tine tip and the scrapers only against the cutting edge substantially perpendicular to the curvature of the cutting edge. Squeezing cutting actions require much rotor driving energy, results in poor quality of the cut crop material, and causes locally concentrated wear of the cutting edges of the cutting blades.

Instead of low-base tines, it is know in practice to equip rotors of cutting units with so-called high-base tines. There the constant radial distance of the outer contour of the base situated ahead of a tine tip in the direction of rotation of the rotor is constant and may amount to about two-thirds of the radial distance of the tine tip end from the axis of the rotor. An advantage of high-base tines is that the cutting action on each cutting blade is executed better than with a low-base tine, meaning that the crop material, while being cut, somewhat slides along the cutting edge of the cutting blade. The improved cutting action results in less rotor driving energy and less squeezing of the crop material. However, high-base tines cannot convey as much crop material as low-base tines, and undesirably restrict the crop material flow rate through the cutting unit.

Further prior art cutting units are disclosed in EP 659 332 A, EP 148 537 A, and EP 64112 A.

In recent years the capacity of such cutting units had to be increased due to the increased processing capacity of e.g. round balers or the demand to fill a large capacity loading wagon rapidly. The crop material flow rate capacity of cutting units was mainly increased by increasing the active diameter of the rotor. However, this results in problems in agricultural machines where the mounting space for the cutting unit is limited. Increasing the rotor diameter also automatically needs higher rotor driving torque, more robust frame structures, results in a higher total weight of the machines, and higher manufacturing costs.

BRIEF SUMMARY OF THE INVENTION

It is an object of the invention to improve the crop material conveying and cutting performance of a cutting device having a rotor with relatively small diameter.

This object is achieved with a cutting device having the features of claim 1.

By designing the respective tine with a gradually ascending compression surface ahead of the tine tip in the direction of rotation of the rotor, the compression surface beginning well-ahead of the tine tip and e.g. ending at the transition into the tine tip, the rotor cannot only take a maximum quantity of supplied crop material, but it also is assured that the crop material is cut by a favorable oblique cutting action or pulling cutting action along the cutting edge of the cutting blade. The design of the tine results in improved conveying and cutting performance of the cutting unit and assures that almost the entire length of the cutting edge of the cutting blade is effectively used for efficiently cutting the crop material without significantly squeezing the crop material during the cutting action. The crop material flow rate to and past the rotor is relatively high, because first the lower region of the compression surface allows that a large supplied crop material flow reaches the tapering gap between the rotor and the cutting edges of the cutting blades before the gradually ascending compression surface is rotated into the region of the gap. The following action of the gradually ascending compression surface on the crop material in the gap at the cutting edges of the cutting blades generates additional compression and a forced movement of the crop material toward and along the cutting edge, which compression and movement both contribute to a more efficient cutting process. The trailing tine tip conveying flank then forces the compressed crop material further along the cutting edge of the cutting blade, such that the cutting blade cuts the crop material by an oblique cutting action or pulling cutting action. This prevents a mainly squeezing cutting action with degradation of the quality of the cut crop material by squeezing. For executing a squeezing cutting action more driving action has to be input than in the case of an oblique or pulling sliding action. The tine with the ascending compression surface, thus, has a hybrid design. Before the tine engages into the crop material flow it behaves like a low-base tine. During the engagement and the cut it performs with the ascending compression surface even better than a conventional high-base tine.

In a preferred embodiment, the compression surface is convexly curved. The convex curvature of the compression surface results in uniformly increasing compression and forced displacement of the crop material, with the crop material being conveyed by both the compression surface and the conveying flank towards and finally over and along the cutting edge of the cutting blade.

In another preferred embodiment, the compression surface follows a section of an arc of a circle, the center of the circle being positioned between the axis of the base body and the tine tip, with the radius of the circle being larger than the radius of the periphery of the base body. Forming the compression surface into a circle facilitates easy manufacturing of the tines, e.g., by laser cutting or torch cutting from steel sheet material. Alternatively, the compression surface either may follow a substantially straight or a slightly concave curved line.

In an expedient embodiment, the width of the compression surface measured in axial direction of the rotor at least substantially corresponds with the width of the conveying flank of the tine tip. The compression surface may operate like a crop material "strangling" collar in the same plane as the tine tip or even like a collar between two tines in the same radial plane.

In a further preferred embodiment, the transition from the compression surface into the conveying flank is concavely rounded. The concavely rounded transition assures smooth conveyance of the crop material and avoids that crop material remains at the transition after the cutting action. Preferably, also the conveying flank may have a concavely rounded curvature.

Preferably, the compression surface of the tine arrangement extends over an angular range of about 60° to about 100°. This angular extension of the compression surface generates a uniformly increasing compression in and displacement of the crop material over a wide angle range of the rotation of the rotor.

The maximum distance of the compression surface from the axis of the rotor may amount to about two-thirds of the distance of the tine end from the axis of the rotor, while the minimum distance of the compression surface may amount to about half of the distance of the tine end from the axis. In this fashion, the rotating compression surface progressively compresses the crop material flow, e.g. over a rotation of about 60° to 100°.

In a preferred embodiment, the tine arrangement may comprise a single or at least two adjacent ring structures, each ring structure having one, two or even more tine tips then distributed in circumferential direction, and the same number of compression surfaces. The two ring structures of the tine arrangement are spaced so far apart from each other that the cutting blade may engage in between. Additively or alternatively cutting blades may engage at the outer sides of the tine arrangement. The tine tips of the ring structures each of the tine arrangement are placed on the base body without circumferential phase shifts, but are in-phase and congruent with each other in viewing direction along the axis of the rotor. Even more than two ring structures each with at least one tine tip may form a respective one of the tine arrangements of the rotor. This means that the two or three in-phase tine tips and the compression surfaces are processing the crop material at the same time.

For facilitating manufacturing of the rotor, the respective ring structure may consist from at least two tines each having at least one tine tip and a base. Each tine may extend over about 180° on the periphery of the base body. The respective compression surface may extend over about 80° of the 180° extension of the base of the tine.

In order to assure a smooth removal of crop material from the conveying flank and the tine tip, it is expedient if the conveying flank and the respective scraper cooperating with the tine tip are arranged with a relative angle of about 90° in relation to each other, in rotary positions of the rotor in which the conveying flank crosses a scraper, preferably crosses an end of the scraper, proximate to the periphery of the base body. An angle about 90° or more assures that the scraper easily lifts the crop material off the passing conveying flank.

Preferably, the compression surface when passing the scraper forms an open obtuse angle of about 135° or even more with the scraper. This facilitates easy removal of the cut crop material by the scraper and good compression of the crop material against the cutting edge.

In other embodiments, the conveying flank, the compression surface, the at least one cutting blade functionally associated with the tine, and the cutting unit bottom commonly define a compression zone with decreasing width in conveying direction, while the rotor rotates. Within the compression zone the rotating compression surface already progressively compresses crop material in a direction obliquely towards the cutting edge of the cutting blade. Then the conveying flank trailing behind the compression surface assisted by a clamping action of the compression surface wipes the compressed crop material along almost the full length of the cutting edge in order to achieve the desirable oblique cutting or pulling cutting action.

BRIEF DESCRIPTION OF THE SEVERAL VIEWS OF THE DRAWINGS

An embodiment of the invention will be explained with the above drawing. In the drawing is.

DETAILED DESCRIPTION OF THE INVENTION

Figure 1:
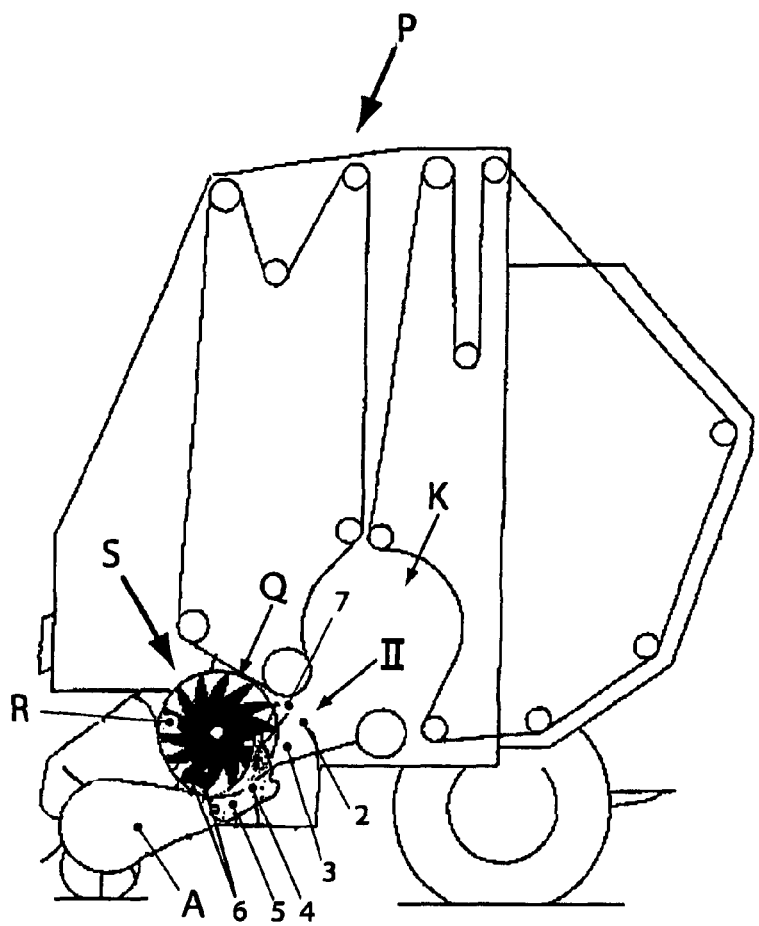
FIG. 1: a schematic side view of a cutting unit integrated into a round baler as an example of an agricultural machine.

FIG. 1 schematically illustrates a round baler P as an example of an agricultural machine containing a cutting unit S. Similar cutting units as well may be implemented in other agricultural machines like in loading wagons or the like.

The round baler P is towed on the ground from right to left and collects crop material like mowed grass or fodder, e.g. in the form of swathes on the ground, by a pick-up device A, which supplies the collected crop material into a conveying channel 3 of the cutting unit S. The cutting unit S contains a rotating rotor R extending crosswise through the conveying channel 3. The rotor R, optionally, may include at both ends collecting augers Q for laterally compressing the widely collected crop material flow to the width of the conveying channel 3.

The cutting unit S is mounted in a mounting space at a lower region of a casing 1 of the round baler P. The conveying channel 3 is designed such that it its inlet and outlet are arranged substantially in-line with the outlet leading to an opening 2 of a baling chamber K of the round baler P. A cutting unit bottom 4 forms a lower boundary of the slightly upwardly inclined conveying channel 3. A lateral array of cutting blades 5 supported below the cutting unit bottom 4 protrudes upwardly and overlap with tine arrangements 6, Z of the rotor R. Cutting edges of the cutting blades 5, e.g. are concavely curved, face counter to the conveying direction in the conveying channel 3, and extend towards a cylindrical base body of the rotor R. In the direction of rotation of the rotor R, behind the cutting blades 5 and overlapping the cutting blades 5 and the tine arrangements 6, Z of the rotor R a lateral array of scrapers 7 is mounted for removing crop material cut by the cutting blades 5 from the tine arrangements 6, Z.

Figure 2:
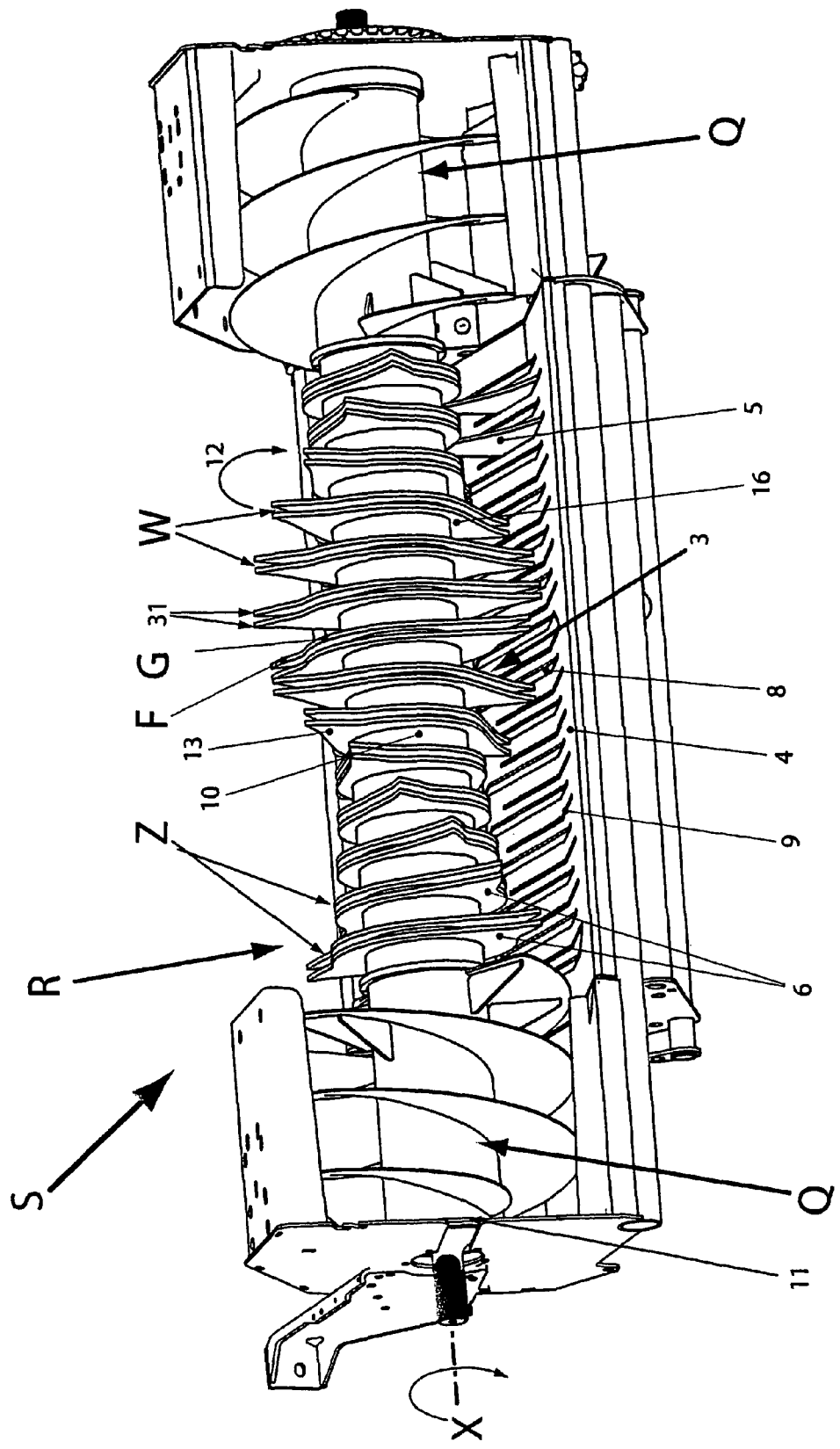
FIG. 2: a perspective view of the cutting unit of FIG. 1, FIG. 3: a detailed plan view in enlarged scale of a tine arrangement of a rotor of the cutting unit of FIG. 2, FIG. 4: a cross-sectional view of the cutting unit in a certain operational phase, of the rotor.

FIG. 2 illustrates a perspective front view of the cutting unit S with some housing parts removed for clarity's sake. The rotor R has a substantially cylindrical (e.g. tube-shaped) base body 11 carrying, e.g. on a base body periphery 10, a plurality of parallel but spaced apart tine arrangements 6, Z. Each tine arrangement 6, Z consists in the shown embodiments of two adjacently located, parallel ring structures 31, e.g. made from steel sheet material by laser cutting or torch cutting, but alternatively could be just one ring structure 3, or even a single tine W or several circumferentially separated tines W. The ring structures 31 are substantially planar and perpendicular to the axis X of the rotor R, which may be driven in FIG. 2 in clockwise direction 12 at the left end via an indicated driving shaft. Each tine arrangement 6 Z may consist of even three ring structures 31. The two or more adjacent ring structures 31 are spaced apart only with a distance facilitating the engagement of one cutting blade 5. The cutting blades 5 protrude through slots 9 in the cutting unit bottom 4. At both sides of each slot 6, guiding ribs 8 may be welded on the bottom 4. A lateral cross-beam 7' carries the array of scrapers 7. The direction of rotation of the tine equipped rotor R is indicated by reference number 12 and defines the conveying direction through the conveying channel 3, namely in FIG. 2 from the front side to the rear side. The compressing augers Q as well may be mounted on the base body 11 of the rotor R.

In a not shown embodiment of a cutting unit S at least the conveying flank F and the compression surface G may be formed by components somewhat broader than the conveying flank F shown in FIG. 2. These components could be secured on edges of steel sheet tines W e.g. by welding. Such broader tine designs might be useful in loading wagons.

Each ring structure 31 has at least one tine W. In the embodiment shown in FIG. 2, two substantially diametrically opposed tines W are provided in each ring structure 31. Instead, and not shown, there may be only a single tine W provided or even more than two circumferentially distributed tines W. Each tine W has a substantially triangular tine tip 13, a leading conveying flank F and a compression surface G extending in the direction 12 of rotation of the rotor R ahead of the conveying flank F. The tine tip 13 is unified with a base 16, e.g. having the same thickness or axial width in the direction of the axis X of the rotor like the conveying flank F of the tine tip 13. Each tine W is secured with the base 16, e.g. by welding, either on the periphery 10 of the base body 11 or within the base body 11. The base 16 is shaped like a ring segment and serves to secure the tine W on the base body 11.

The tine arrangements 6, Z are arranged in the base body 11 with relative circumferential phase shifts in between adjacent tine arrangements 6, Z. In the embodiment shown in FIG. 2, starting from the first tine arrangement 6 on the left side, each subsequent tine arrangement is arranged with a phase shift counter to the direction 12 of the rotation such that its tine tips 13 trail behind the tine tips 13 of the preceding tine arrangement 6, Z.

Figure 3:
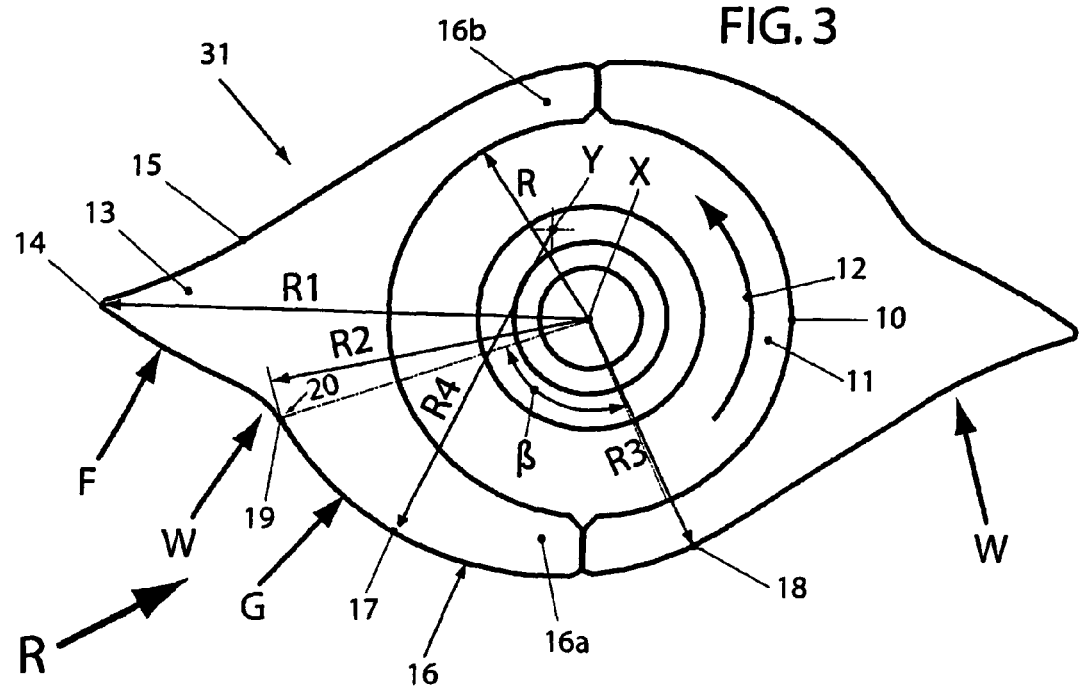

FIG. 3 is a cross-sectional view of the rotor R and illustrates the design of the tines W in more detail.

The tine tip 13 protrudes outwardly from the base 16 to a tine end 14. The tine tip 13 forms the conveying flank F (leading in the direction 12 of rotation of the rotor R) and a trailing flank 15, the leading conveying flank F extending e.g. with a convex curvature to a section 16a of the base 16, while the trailing flank 15 extends to a section 16b of the base 16. The base 16, in the embodiment shown in FIG. 3, spans over approximately 180° of the periphery 10 of the base body 11. The conveying flank F forms a transition 20 with an outer contour 17 of the base section 16a.

According to the invention, the outer contour 17 of the base section 16a gradually ascends from a starting point 18 to an end point 19 e.g. the transition 20 counter to the direction 12 of rotation. The transition 20 may be rounded concavely. The tine end 14 has a distance R1 from the axis X. The outer contour 17 of the base section 16a forms a gradually ascending compression surface G of the tine W. The starting point 18 has a radial distance R3 from the axis X of the rotor R, while the end point 19 has a radial distance R2 from the axis X. The curvature of the compression surface G may be a section of a circle, e.g. of a circle shown in FIG. 3 with a radius R4 and a center Y situated between the axis X and the tine tip 13. Alternatively, the compression surface G could follow a substantially straight tine (not shown).

The radial distance R3 e.g. may amount to about half of the radial distance R1. The radial distance R2 may amount to about two-thirds of the radial distance R1. The periphery 10 of the base body 11 has a radius R. The radius R4 of the compression surface G is somewhat larger than the radius R. The compression surface G extends over an angular range between about 60° to about 100°, in the embodiment shown, about 80°. The compression surface G of the tine W may extend within a smaller angular range if there is more than two tine tips 13 on the ring structure 31, and may extend over a larger angular range in the case that a single tine W with only a single tine tip 13 is provided in the ring structure 31. In the case shown, with a pair of ring structures 31 per tine arrangement 6, Z, the tine tips 13 and the compression surfaces G are provided in the pair in-phase without any circumferential phase shift, i.e. they are at least substantially congruent with each other in viewing in the direction of the axis X.

The ring structure 31 in FIG. 3 may consist of two or more tines W, which are secured on the periphery 10 separately, however, alternatively the ring structure 31 could be a one-pieced part, or could even be combined from more than two parts. Alternatively, each tine W may even have more than a single tine tip 13, and more than a single compression surface G. The above stated dimensioning of the tine W is preferably an example, but is not mean any limitation. The core of the invention is to provide a compression surface G ahead of the tine tip 13, which compression surface G gradually rises towards the conveying flank F and thus, acts actively in the crop material over a limited part of a full revolution of the rotor R only, while the rotor R is rotating.

In FIG. 3, the trailing base section 16a of each tine W designed may be such that the respective starting point 18 of the compression surface G located ahead of the conveying flank F of the left side tine tip 13 is provided on the trailing base section 16a of the right side tine tip 13, meaning that here e.g. the compression surface G shares both bases 16 of the tines W.

Figure 4:
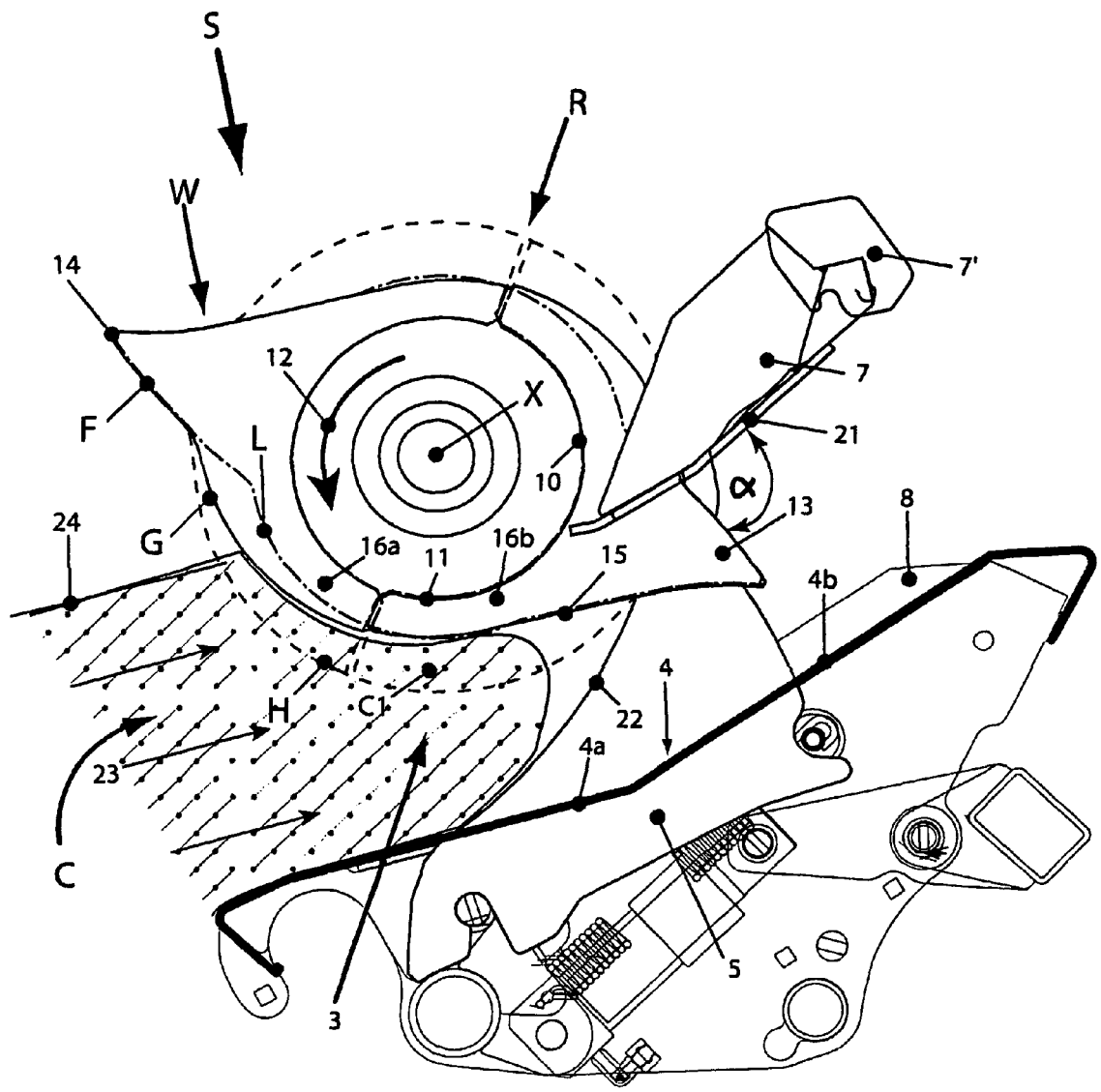

FIG. 4 shows a certain operational phase of the cutting unit S, while the rotor R rotates in the direction 12 about the axis X. The conveying channel 3 may have an upper boundary 24 in the inlet region, which upper boundary 24 at least temporarily may extend substantially parallel to an inlet section 4a of the cutting unit bottom 4, the outlet section 4b of which is inclined somewhat steeper upward than the inlet section 4a. Each cutting blade 5 is suspended below the cutting unit bottom 4 such that it may yield in case of a trapped object and has a concavely curved cutting edge 22 facing opposite the conveying direction 23 in the conveying channels as defined by the direction 12 of the rotation of the rotor R. Crop material C is supplied into the conveying channel 3 towards the tapering gap formed between the cutting edges 22 of the cutting blades and the rotor R. In FIG. 4 the tine tip 13 on the right side just passes the scrapers 7, e.g. having scraper fingers 21 extending from the stationary mounted cross-beam 7' to the region of the periphery 10 of the base body 11. The cutting edges 22 may partially overlap with the scraper fingers 21 or may end close to the scraper fingers 21. The left side tine tip 13 has not yet entered the conveying channel 3 with the compression surface G of the left side tine tip 13 just started to enter the conveying channel 3 for later compressing the supplied crop material C in a compression zone C1 at the tapering gap between the rotor R and the cutting edges 22. Because of the relatively small radial height of the trailing base section 16b and the trailing flank 15, of the right side tine tip 13, crop material C (in a rotary position of the rotor somewhat earlier than shown in FIG. 4) easily advances into the compression zone C1 before the compression surface G of the right side tine tip 13 starts to come into engagement with the supplied crop material.

FIG. 4 also illustrates important differences between the design of the tines W according to the invention and designs of conventional tines. In dotted lines in FIG. 4, a conventional high-base tine design H is indicated, the passive base of which follows a circle around axis X with a constant radial distance from the axis X e.g. corresponding to approximately two-thirds of the radial distance of the tine end 14 from the axis X. The dotted line high-base tine design H clearly illustrates the then given width restriction of the inlet region of the conveying channel 3. Also in FIG. 4, a conventional low-base tine design L is indicated by dashed-dotted lines. In the low-base tine design L, the passive base section 16a has a constant radial distance from the axis X substantially corresponding with half of the radial distance of the tine end 14 from the axis X. The low-base tine design L does restrict the width of the conveying channel 13 substantially to the same extent as the tine design according to the invention does, however, the low-base tine design L unavoidably results in a squeezing cutting action on the cutting edges 22, because the long conveying flank F presses the crop material C against the scrapers 7 and at the same time substantially perpendicularly against the cutting edge 22 resulting in an undesirable squeezing cutting action.

The high-base tine design H and the low-base tine design L are indicated in FIG. 4 for illustrative purposes only, and in order to emphasize the important difference of the tine design according to the invention with the gradually ascending compression surface G at the leading side of the conveying flank F of each tine tip 13.

Figure 5:
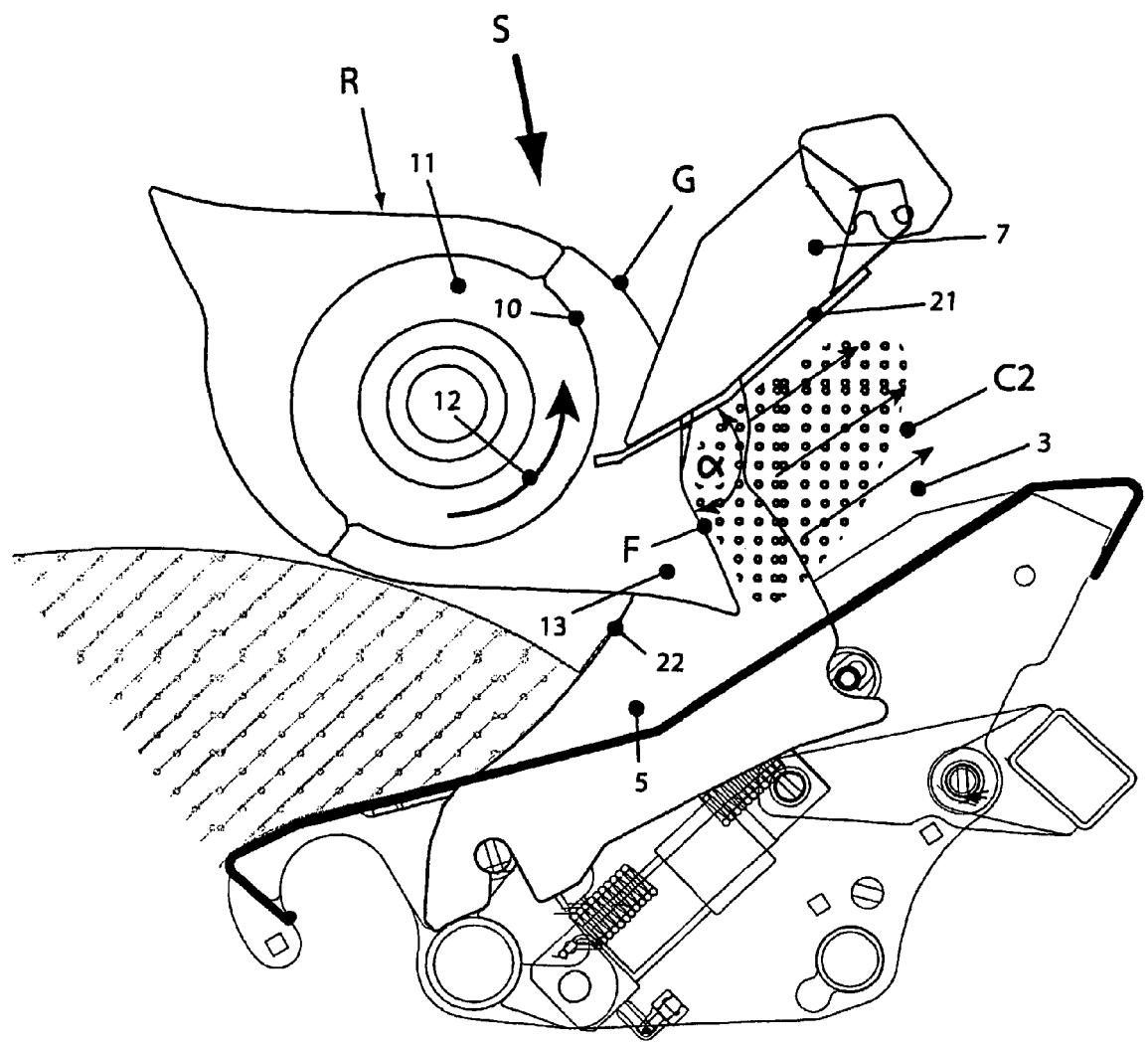
FIG. 5: a view similar to FIG. 4 in another operational phase.

FIG. 5 illustrates an operational phase of the cutting unit S with the right side tine tip 13 overlapping with the scrapers 7 or the scraper fingers 21, the conveying flank F conveying cut crop material C2 along the scraper fingers 21. This rotary position of the rotor R with the conveying flank F just crossing the end of the scraper fingers 21 close to the periphery 10 of the base body 11 is a favorable situation, because the conveying flank F and the scraper fingers 21 form an angle α of about 90°, while the compression surface G even forms an obtuse open angle of about 145° with the scraper fingers 21. This means that during further rotation of the rotor in the direction 12, the conveying flank F and the compression surface G actively co-act and commonly smoothly, and easily remove cut crop material C2 along the scraper fingers 21.

Figure 6:
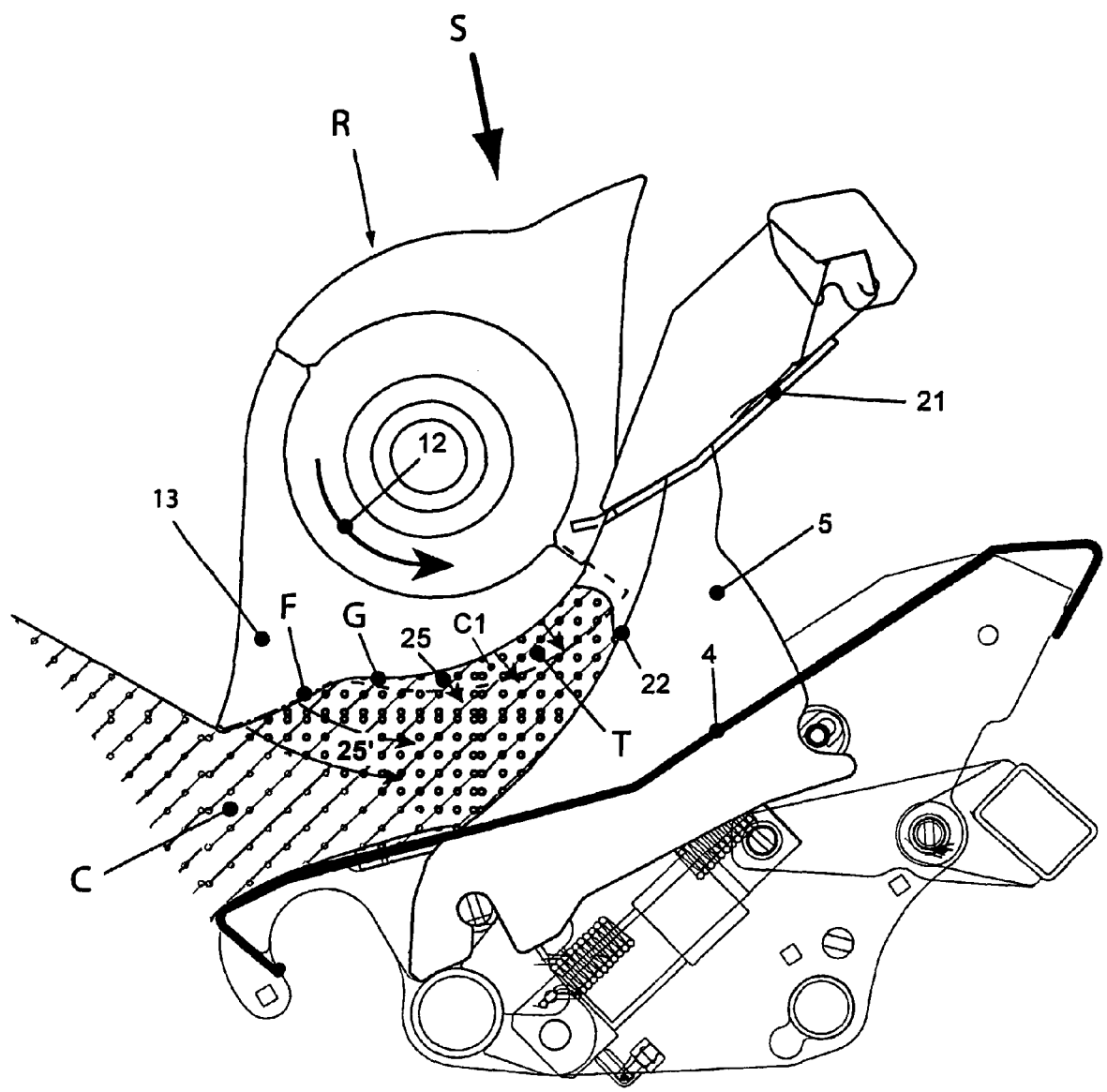
FIG. 6: a view similar to FIG. 4, in another operational phase.

FIG. 6 illustrates an earlier operational phase of the cutting unit S where the left side tine tip 13 has started to engage into the supplied crop material, which in the compression zone C1 already has been compressed and displaced obliquely by the actively engaging rotating compression surface G towards the cutting edge 22. The compression surface G is acting with forces 25 arrows substantially directed towards the cutting unit bottom 4, while the conveying flank F is acting with forces indicated by arrows 25'. The forces in the directions of the arrows 25, 25' efficiently force the crop material C along the full length of the cutting edge 22, in particular so that the compressed crop material flow is wiped upwardly along the cutting edge 22, while it is cut obliquely over the cutting edge 22. The cut crop material then hits the scraper fingers 21 and is deflected. The influence of the compression surface G, the relatively short conveying flank F, and the compression forces according to the arrows 25, 25', all together result in an oblique cutting action or pulling cutting action, meaning that the compressed crop material C is wiped along the entire cutting edge 22 of the cutting blade 5, while being cut. The cutting edge 22, thus, generates relative moderate cutting resistance only, uses nearly the entire length for cutting, and remains sharp for longer service time because it has to withstand less mechanical load and wears uniformly. As a result the rotor driving energy is used more efficiently and economically.

Figure 7:
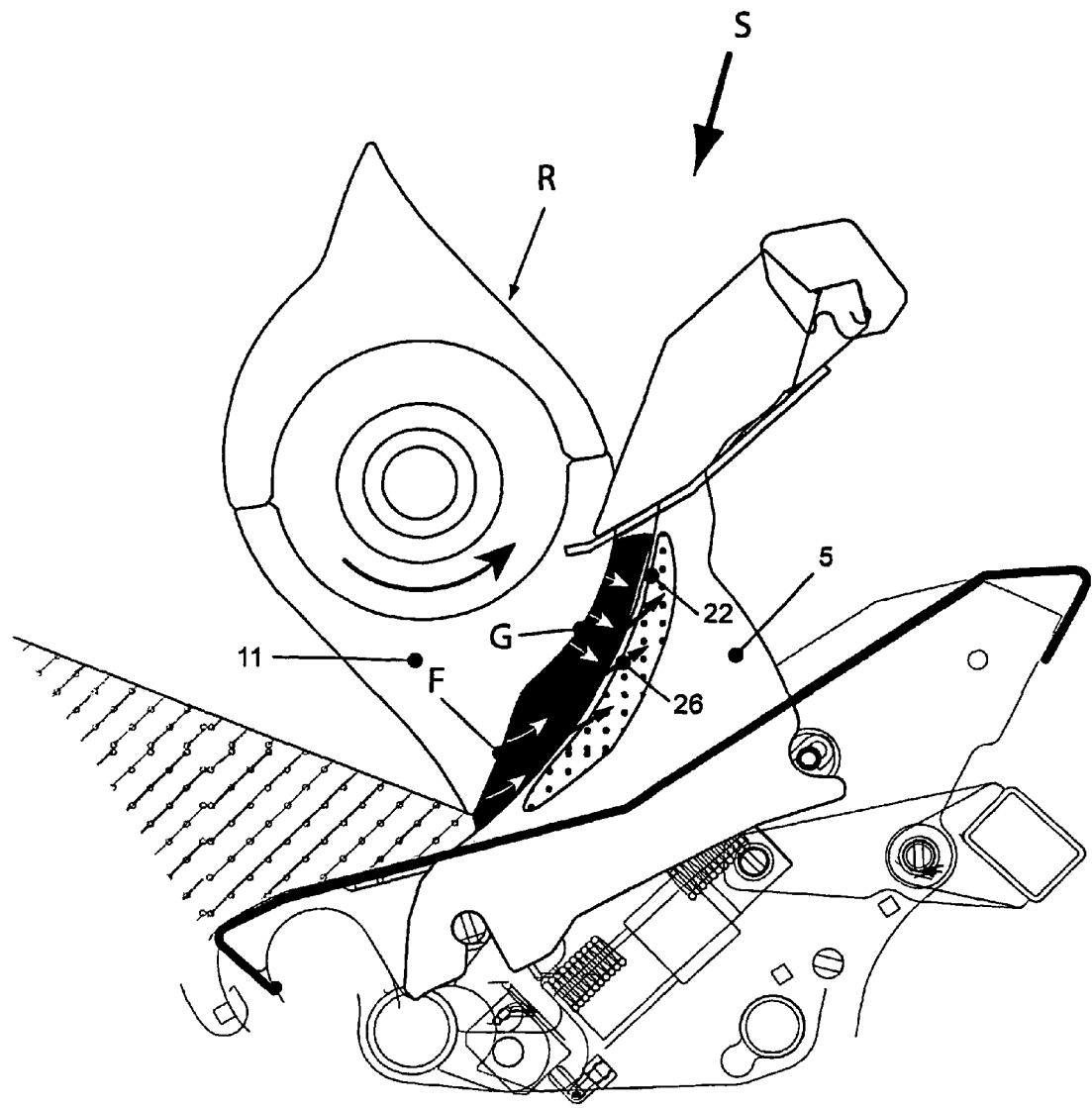
FIG. 7: a view similar to FIG. 4, in a further operational phase.

FIG. 7 illustrates how the compression surface G and the conveying flank F both force the compressed crop material into an oblique cutting action or pulling cutting action along the cutting edge 22, as indicated by arrows 26 in a final operational phase of the action of the right side tine W during a 360° revolution of the rotor R. The oblique cutting action does not only result in well defined cuts in the crop material without significantly squeezing the crop material, but also distributes the cutting action along the entire cutting edge 22 and over a relatively large angular range of the rotation of the rotor R avoiding locally concentrated wear of the cutting edge 22. Furthermore, the oblique cutting action needs less rotor driving power. The combined active action of the conveying flank F and the compression surface G first coming into action after a large quantity of crop material C has been fed to the region close to the cutting edges 22 promotes a relatively high crop material flow rate through the cutting unit S.

The invention claimed is:
1. A cutting unit for agricultural machines, or for balers or loading wagons, comprising:
a rotor including an at least substantially cylindrical base body carrying tine arrangements, the tine arrangements being parallel to each other in planes perpendicular to an axis of the base body and distributed in the direction of the axis of the base body with intermediate distances in between, each tine arrangement including at least one tine including a base secured to the base body and at least one outwardly protruding, substantially triangular tine tip, the tine tip including a conveying flank leading in a direction of rotation of the rotor and extending from an outer tine end to a transition into the base;

a cutting unit bottom distant from the rotor forming a lower boundary of a conveying channel through the cutting unit;

cutting blades protruding from the cutting unit bottom through the conveying channel besides moving paths of the tine tips, cutting edges of the cutting blades being oriented counter to the conveying direction in the conveying channel as defined by the direction of rotation of the rotor; and scrapers placed in conveying direction behind the rotor, the scrapers extending in between the tine arrangements close to a periphery of the base body, wherein an outwardly facing compression surface is provided at least at the base of the tine in the direction of rotation of the rotor ahead of the conveying flank, and the compression surface gradually ascends opposite to the direction of rotation at least substantially up to the transition into the conveying flank, and wherein the compression surface while passing the scraper presents an open obtuse angle of 135° or more with the scraper.

2. A cutting unit according to claim 1, wherein the compression surface is convexly curved.

3. A cutting unit according to claim 2, wherein the compression surface follows a section of an arc of a circle, the center of the circle being positioned in a region of the tine between the axis of the base body and the tine tip, the radius of the circle being larger than the radius of the periphery of the base body.

4. A cutting unit according to claim 1, wherein the width of the compression surface measured in the direction of the axis at least substantially corresponds with the width of the conveying flank.

5. A cutting unit according to claim 1, wherein the transition from the compression surface into the conveying flank is concavely rounded.

6. A cutting unit according to claim 1, wherein the compression surface extends over an angular range of the tine arrangement of about 60° to about 100°.

7. A cutting unit according to claim 1, wherein a maximum distance of the compression surface from the axis amounts to about two-thirds, and a minimum distance of the compression surface from the axis amounts to about half respectively of a distance of the tine tip end from the axis.

8. A cutting unit according to claim 1, wherein each tine arrangement comprises at least two adjacently positioned ring structures, or spaced apart with a distance allowing an engagement of a cutting blade in between, each ring structure including one or two or more circumferentially distributed tine tips and a same number of compression surfaces, the tine tips, the conveying flanks, and the compression surfaces of the ring structures of the tine arrangement being arranged without a circumferential phase-shift in phase and congruently in a viewing direction along the axis of the rotor of a tine arrangement.

9. A cutting unit according to claim 1, wherein a ring structure is combined from at least two diametrically opposed tines, each including at least one tine tip, the base of the respective tine spanning over about 180° on the periphery of the base body, the respective compression surface of the tine extending in an arcuate measure over about 80°.

10. A cutting unit according to claim 1, wherein in rotary positions of the rotor in which a conveying flank crosses a scraper, or crosses an end of the scraper close to a periphery of the base body, an angle of about 90° is defined between the conveying flank and the scraper.

11. A cutting unit according to claim 1, wherein the conveying flank of the tine tip, the compression surface, the at least one cutting blade associated to the tine, and the cutting unit bottom commonly define a compression zone within the conveying channel, which compression zone decreases in width in a crop material conveying direction through the conveying channel.

12. A cutting unit according to claim 1, wherein the tine tip includes a trailing flank opposite of the conveying flank at a tine end of the tine tip, the trailing flank extending to a section of the base.

13. A cutting unit according to claim 1, wherein the scrapers are carried on a lateral cross-beam, and the each scraper includes a scraper finger extending from the cross-beam to a region of the periphery of the base body.

* * * * *